United States Patent [19]

Cremer et al.

[11] Patent Number: 4,483,837

[45] Date of Patent: Nov. 20, 1984

[54] PROCESS FOR MAKING CALCIUMMONOHYDROGEN PHOSPHATE DIHYDRATE

[75] Inventors: Josef Cremer, Hürth; Josef Holz, Grevenbroich; Hans Haas, Swisttal Strassfeld; Friedrich Schulte, Mechernich, all of Fed. Rep. of Germany

[73] Assignee: Hoechst Aktiengesellschaft, Fed. Rep. of Germany

[21] Appl. No.: 507,784

[22] Filed: Jun. 24, 1983

[30] Foreign Application Priority Data

Jul. 23, 1982 [DE] Fed. Rep. of Germany ....... 3227523

[51] Int. Cl.$^3$ ...................... C01B 15/16; C01B 25/26
[52] U.S. Cl. ..........................: 423/309; 423/305; 423/307; 423/308
[58] Field of Search ............... 423/309, 313, 311, 305, 423/307, 308

[56] References Cited

U.S. PATENT DOCUMENTS 2,890,934  6/1959  Bart ...................................... 423/307
3,294,486  12/1966  Cremer et al. ....................... 423/309

FOREIGN PATENT DOCUMENTS 39-3273  3/1964  Japan ................................... 423/311

*Primary Examiner*—Gregory A. Heller
*Attorney, Agent, or Firm*—Connolly & Hutz

[57] ABSTRACT

The disclosure relates to a process for making calciummonohydrogen phosphate dihydrate with a high degree of whiteness from pure phosphoric acid and naturally occurring calcium carbonates. More particularly, a fine-particulate calcium carbonate is suspended in water and the suspension is mixed at temperatures between 0° and 60° C. with phosphoric acid so as to establish a Ca/P-ratio of 0.20 up to 0.57. The phosphoric acid is added in quantities per unit time preventing the resulting mixture from foaming over. Next, solid matter constituents are separated from the mixture, after $CO_2$ has ceased to evolve, with the resultant formation of a clear colorless acid solution. This solution and an aqueous suspension or solution of pure alkali metal and/or alkaline earth metal carbonates and/or hydroxides, are jointly introduced into a reaction zone at a reaction temperature of 20° to 45° C. so as to establish a pH-value initially of 2.0 to 5.0 and then, towards the end of the reaction of 6.0 to 8.0. Finally, the reaction product is filtered off, washed out, and dried in known fashion.

18 Claims, No Drawings

PROCESS FOR MAKING CALCIUMMONOHYDROGEN PHOSPHATE DIHYDRATE

The present invention relates to a process for making calciummonohydrogen phosphate dihydrate presenting a high degree of whiteness, from pure phosphoric acid and naturally occurring calcium carbonate.

As disclosed in U.S. Pat. No. 3,294,486, the production of calciummonohydrogen phosphate dihydrate presenting a high degree of whiteness invariably calls for the use of high-grade feed materials. More particularly, phosphoric acid obtained by burning yellow phosphorus is used together with very carefully selected calcium carbonates or calcium hydroxides made therefrom. Use can, however, also be made of calcium carbonate precipitated from calcium hydroxide by subjecting this latter to treatment with $CO_2$, or of calcium carbonate obtained from calcium nitrate by converting treatment with $NH_3$ and $CO_2$, the calcium nitrate originating, for example, from the production of compound fertilizers by processing crude phosphates with nitric acid.

More specifically, U.S. Pat. No. 3,294,486 disclosed a process for making calciummonohydrogen phosphate dihydrate presenting a high degree of whiteness, wherein thermally processed phosphoric acid, calcium chloride solution and sodium hydroxide solution are reacted in a molar ratio of 1:1:2, and the resulting reaction product is filtered off and worked up.

An adverse effect associated with the use of mineral calcium carbonates or calcium hydroxides made therefrom resides in the fact that naturally occurring carbonates having the purity necessary for the manufacture of calciummonohydrogen phosphate dihydrate with a high degree of whiteness are available in minor quantities only. In addition to this, it is a very expensive operation to produce pure calcium carbonates by subjecting calcium hydroxide to treatment with $CO_2$ or calcium nitrate to converting treatment with $NH_3$ and CO. A further adverse effect associated with the process disclosed in U.S. Pat. No. 3,294,486 resides in the fact that pollutive sodium chloride solution affecting waste water disposal is invariably obtained.

The present invention now provides a process for making calciummonohydrogen phosphate dihydrate presenting a high degree of whiteness which is not handicapped by the formation of pollutive salt solutions and which is carried out with the use of calcium-containing feed materials, which are inexpensive and available in sufficient quantities.

The present process for making calciummonohydrogen phosphate dihydrate with a high degree of whiteness from pure phosphoric acid and naturally occurring calcium carbonates comprises more particularly: suspending a fine-particulate calcium carbonate in water with the resultant formation of a first suspension; mixing said first suspension at temperatures between 0° and 60° C., preferably 10° and 40° C., with phosphoric acid and thereby establishing a Ca/P-ratio of 0.20 up to 0.57, the phosphoric acid being added in quantities per unit time preventing the resulting mixture from foaming over; allowing the evolution of $CO_2$ to subside and separating solid matter constituents from the mixture with the resultant formation of a clear colorless acid solution; jointly introducing, with agitation, said solution and a second aqueous suspension or solution of pure alkaline earth metal and/or alkali metal carbonates and/or hydroxides, respectively, into a reaction zone at a reaction temperature of 20° to 45° C. so as to establish a pH-value initially of 2.0 to 5.0 and then, towards the end of the reaction, of 6.0 to 8.0; and filtering off, washing out, and drying the reaction product in known fashion.

Further preferred and optional features of the present process provide:

(a) for the calcium carbonate forming part of the first suspension to be suspended in two to seven times its quantity of water, depending on the concentration of the phosphoric acid used;

(b) for a sodium hydroxide solution to be used as the aqueous alkali metal hydroxide solution;

(c) for the second suspension to be a suspension of pure calcium hydroxide in water;

(d) for a sodium carbonate solution to be used as the alkali metal carbonate;

(e) for the second suspension to be a suspension of pure calcium carbonate in water;

(f) for the first suspension to be used in admixture with a polyphosphate to establish a relatively high Ca/P-ratio within the limits specified;

(g) for the first suspension to be used in admixture with 0.6 up to 10.0 weight % polyphosphate, based on its calcium carbonate content;

(h) for Graham's salt to be used as the polyphosphate.

In the process of this invention, it is possible to use practically all naturally occurring limestones as feed materials for making calciummonohydrogen phosphate dihydrate with a high degree of whiteness. Use can even be made of relatively heavily contaminated limestone grades which normally have a light yellow or brown coloration. On reacting an aqueous limestone suspension with pure phosphoric acid, the limestone undergoes decomposition with volatilization of $CO_2$ and dissolution of the calcium, whilst the whiteness-affecting contaminants contained in limestone, e.g. iron, nickel, manganese, chromium and carbon are unexpectedly retained in the form of insoluble compounds which are easy to separate from the clear acid solution by decantation or filtration, for example.

The quantity of water to be used for preparing the suspension should conveniently be selected so as to permit use to be made of commercial phosphoric acid, e.g. $H_3PO_4$ of 85% strength. In addition to this, the invention provides for the calcium carbonate to be used in a quantity sufficient to establish a Ca/P-ratio of 0.47:1 in the clear acid solution or a CaO-concentration of about 6% and a $P_2O_5$-concentration of about 21%.

The use of Ca and P in a ratio higher than specified and of reaction temperatures higher than 60° C. should be avoided as directly precipitating calciummonohydrogen phosphate dihydrate is then liable to be separated together with the contaminants which naturally means loss of desirable material.

Despite this, it is possible in the present process to establish a higher Ca/P-ratio in the clear acid solution without short-time precipitation of calciummonohydrogen phosphate dihydrate and increase of the solubility of contaminants provided that the calcium carbonate is reacted with a phosphoric acid having a dissolved polyphosphate admixed with it. More specifically, it is possible in the absence of adverse effects to increase the Ca/P-ratio to 0.57:1 by using the phosphoric acid in admixture with 0.6% Graham's salt, based on calcium carbonate.

In those cases in which the clear acid solution is reacted with pure sodium hydroxide solution or pure sodium carbonate, it is good practice for reasons of economy to use the pure sodium phosphate solution obtained after separation, by filtration, of the calciummonohydrogen phosphate dihydrate, as a feed material for making condensed sodium phosphates, for example.

The reaction of the clear acid solution with pure calcium carbonate or hydroxide in accordance with this invention practically permits the relatively valuable pure calcium raw materials to be more effectively and economically utilized.

Calciummonohydrogen phosphate dihydrate is obtained in accordance with this invention by reacting the clear acid solution with the alkali metal or alkaline earth metal carbonates and/or hydroxides at temperatures lower than 50° C., whilst calciummonohydrogen phosphate (i.e. the product free from water of crystallization) is obtained in at least pro rata proportions by effecting the reaction at temperatures higher than 60° C.

EXAMPLE 1

(Prior art)

A 35 weight % solution of calcium chloride dihydrate (p.a.), a 50 weight % sodium hydroxide solution and a 85 weight % pure phosphoric acid (based on $H_3PO_4$), which were used in a molar ratio of 1:2:1, were jointly introduced into a stainless steel jacket reactor provided with a high speed propeller mixer. In order to provide for an efficient mixing effect from the onset, the reactor had previously been fed with water up to a level necessary for the propeller blades to dip in the water. The calcium chloride solution and sodium hydroxide solution were admitted in a stoichiometric ratio (based on $Ca(OH)_2$) whilst the phosphoric acid was metered in so as to establish, during the reaction, a pH-value initially of 2.5 to 4.5 and, towards the end of the reaction, of about 7. During the introduction of the three reactants, the temperature inside the reactor increased from 22° C. to 42° C. The resulting precipitated calciummonohydrogen phosphate dihydrate was filtered off, washed until practically free from chlorine, and dried at 60° C.

Typical of this product was its "ideal degree of whiteness" which was rated as 100% whiteness.

EXAMPLE 2

(Comparative Example)

Each of the following calcium raw materials, namely:
(I) selected natural calcium carbonate
(II) natural yellowish limestone
(III) natural brownish limestone
(IV) natural greyish limestone
was introduced jointly with 85 weight % pure phosphoric acid into the jacket reactor of Example 1 while establishing a pH-range initially of 2.3 to 3.5. A pH of 7 was finally established by means of sodium hydroxide solution. The reaction temperature was between 20° C. and 40° C. The resulting precipitated material was filtered off, washed and dried as described in Example 1.

The resulting various calciummonohydrogen phosphates dihydrates had the following degrees of whiteness:

| | | |
|---|---|---|
| With raw material (I) | 97% | |
| With raw material (II) | 92% | based on product |
| With raw material (III) | 77% | of Example 1 |
| With raw material (IV) | 70% | |

EXAMPLE 3

(Invention)

32 parts by weight each of raw materials (I) through (IV) of Example 2 were suspended in 182 parts by weight water previously introduced into the jacket reactor of Example 1. The resulting suspension was in each case admixed with 100 parts by weight 85% pure phosphoric acid which was added at a rate preventing the whole from foaming over under the action of evolving $CO_2$. The reaction temperature was maintained within the range 10° C. to 60° C. After the evolution of $CO_2$ had subsided, a minor proportion of undissolved contaminants originating from raw material (I) was separated by decantation, and more significant proportions of residue originating (a) from raw material (II) were removed by separation, (b) from raw material (III) by means of a rotary filter, and (c) from raw material (IV) by means of a filter press. After recycling turbid matter initially obtained for a short while, clear colorless acid solutions containing about 6% CaO and about 21% $P_2O_5$, corresponding to a Ca/P-ratio of about 0.47 were obtained in each case.

The clear acid solutions were in each case introduced jointly with 50 weight % sodium hydroxide solution into the reactor used in Example 1 so that a pH-range initially of 2 to 4.5 was maintained. Towards the end of the reaction, a pH of 7 was established by means of sodium hydroxide solution. The reaction temperature was between 20° C. and 40° C. The resulting precipitated products were filtered off, washed and dried as described in Example 1.

The various calciummonohydrogen phosphate dihydrates had the following degrees of whiteness:

| | | |
|---|---|---|
| With raw material (I) | 99% | |
| With raw material (II) | 100% | based on the product |
| With raw material (III) | 99% | of Example 1 |
| With raw material (IV) | 99% | |

EXAMPLE 4

(Invention)

The clear colorless acid solution obtained with raw material (III) in Example 3 was introduced jointly with fine particulate sodium carbonate into the jacket reactor of Example 1 at a pH which initially varied between 2 and 4.5. A pH of 7 was finally established by means of sodium hydroxide solution of 50 weight % strength. The reaction temperature was between 21° C. and 42° C. The resulting precipitated product was filtered off, washed and dried as described in Example 1.

The calciummonohydrogen phosphate dihydrate so obtained had a degree of whiteness of 99%, based on the product of Example 1.

EXAMPLE 5

(Invention)

The clear colorless acid solution obtained with raw material (II) in Example 3 was introduced jointly with fine particulate calcium carbonate (raw material (I) in Example 2) into the jacket reactor of Example 1 at a pH value which initially varied between 2 and 4. A pH of 7 was finally established by the introduction of an aqueous suspension of pure calcium hydroxide. The reaction temperature was between 20° C. and 40° C. The resulting precipitated product was filtered off, washed and dried as described in Example 1.

The calciummonohydrogen phosphate dihydrate so obtained had a degree of whiteness of 99%, based on the product of Example 1.

EXAMPLE 6

(Invention)

The clear colorless acid solution obtained with raw material (I) in Example 3 was introduced jointly with an aqueous suspension of pure calcium hydroxide into the jacket reactor of Example 1 at a pH which initially varied between 2 and 5. A pH of 7 was finally established by means of the calcium hydroxide suspension. The reaction temperature was between 22° C. and 42° C. The resulting precipitated product was filtered off, washed and dried as described in Example 1.

The calciummonohydrogen phosphate dihydrate had a degree of whiteness of 99%, based on the product of Example 1.

EXAMPLE 7

(Invention)

190 parts by weight water containing 0.22 part by weight dissolved Graham's salt [$(NaPO_3)_x$] was introduced into the jacket reactor of Example 1. Next, 39 parts by weight calcium raw material (IV) of Example 2 was added and 100 parts by weight 85 weight % pure phosphoric acid was introduced into the suspension at a rate preventing the whole from foaming over under the action of evolving $CO_2$. The reaction temperature was maintained within the range 10° C. to 30° C. After the evolution of $CO_2$ had subsided, insoluble residue was separated by means of a filter press. Turbid matter obtained for a short while, was recycled and a clear colorless acid solution which contained about 7% CaO and about 20% $P_2O_5$, corresponding to a Ca/P-ratio of about 0.57 was obtained.

This clear acid solution was introduced jointly with fine particulate ca-carbonate (raw material (I)) In Example 2 into the jacket reactor of Example 1, the pH-value varying initially between 2.5 and 4.0. A pH of 7 was finally established by the addition of an aqueous suspension of pure calcium hydroxide. The reaction temperature was between 22° C. and 40° C. The resulting precipitated product was filtered off, washed and dried as described in Example 1.

The calciummonohydrogen phosphate dihydrate so obtained had a degree of whiteness of 99%, based on the product of Example 1.

The degree of whiteness indicated in Examples 1 through 7 was metered using an electric remission photometer ("ELREPHO", a product of Carl Zeiss company) and monochromatic light with a wave length of 577 nm (filter R 57).

In Examples 3 and 7 it was possible to prevent foaming over under the action of evolving $CO_2$ by the addition of standard defoaming agents based e.g. on silicones.

In Examples 3 through 7 it was possible to facilitate the separation of solid matter constituents of the solution by the addition of standard flocculation aids based e.g. on polyacryl amides.

The pure phosphoric acid used in Example 1 through 7, can be made either by burning yellow phosphorus and adsorbing resulting $P_2O_5$ or by subjecting wet-processed phosphoric acid to extractive purification as disclosed e.g. in European Specification EP-OS No. 0 029 132, with successive defluorination.

We claim:

1. A process for making calciummonohydrogen phosphate dihydrate with a degree of whiteness of about 100 percent when measured when using an electric remission photometer and monochromatic light with a wavelength of 577 monometers from pure phosphoric acid and naturally occurring limestone which comprises: suspending a fine-particulate limestone containing contaminants impairing the degree of whiteness in water with the resultant formation of a first suspension; mixing said first suspension at temperatures between 0° and 60° C. with phosphoric acid and thereby establishing a Ca/P-ratio of 0.20 up to 0.57, the phosphoric acid being added in quantities so as to prevent the resulting mixture from foaming over; allowing the evolution of $CO_2$ to subside and separating said contaminants from the mixture with the resultant formation of a clear colorless acid solution; jointly introducing, with agitation, said solution and a second aqueous suspension of pure alkaline earth metal compounds selected from the group consisting of carbonates, hydroxides, and mixtures thereof into a reaction zone at a reaction temperature of 20° to 45° C. so as to establish a pH-value initially of 2.0 to 5.0 and then, towards the end of the reaction, of 6.0 to 8.0; and filtering off, washing out, and drying the calciummonohydrogen phosphate dihydrate.

2. The process as claimed in claim 1, wherein the first suspension is mixed with the phosphoric acid at temperatures of 10° to 40° C.

3. The process as claimed in claim 1, wherein the second suspension is a suspension of pure calcium carbonate in water.

4. The process as claimed in claim 1, wherein the second suspension is a suspension of pure calcium hydroxide in water.

5. The process as claimed in claim 1, wherein the solution and second suspension are introduced into the reaction zone at a pH-value initially of 2.5 to 3.5.

6. The process as claimed in claim 1, wherein the calcium carbonate forming part of the first suspension is suspended in two to seven times its quantity of water.

7. The process as claimed in claim 1, wherein the first suspension is used in admixture with a polyphosphate to establish a Ca/P-ratio up to 1.

8. The process as claimed in claim 7, wherein the first suspension is used in admixture with 0.6 up to 10.0 weight % polyphosphate, based on its calcium carbonate content.

9. The process as claimed in claim 7, wherein Graham's salt is used as the polyphosphate.

10. A process for making calciummonohydrogen phosphate dihydrate with a degree of whiteness of about 100 percent when measured when using an electric remission photometer and monochromatic light with a wavelength of 577 monometers from pure phosphoric acid and naturally occurring limestone which comprises: suspending a fine-particulate limestone containing contaminants impairing the degree of whiteness in water with the resultant formation of a suspension; mixing said suspension at temperatures between 0° and 60° C. with phosphoric acid and establishing a Ca/P-ratio of 0.20 up to 0.57, the phosphoric acid being added in quantities so as to prevent the resulting mixture from foaming over; allowing the evolution of $CO_2$ to subside and separating said contaminants from the mixture with the resultant formation of a first clear colorless acid solution; jointly introducing, with agitation, said first solution and a second aqueous solution of pure alkali metal compounds selected from the group consisting of carbonates, hydroxides, and mixtures thereof into a reaction zone at a reaction temperature of 20° to 45° C. so as to establish a pH-value initially of 2.0 to 5.0 and then, towards the end of the reaction, of 6.0 to 8.0; and filtering off, washing out, and drying the calcium-monohydrogen phosphate dihydrate.

11. The process as claimed in claim 10, wherein the suspension is mixed with the phosphoric acid at temperatures of 10° to 40° C.

12. The process as claimed in claim 10, wherein a sodium hydroxide solution is used as the aqueous alkali metal hydroxide solution.

13. The process as claimed in claim 10, wherein a sodium carbonate solution is used as the aqueous alkali metal carbonate solution.

14. The process as claimed in claim 10, wherein the first solution and second solution are introduced into the reaction zone at a pH-value initially of 2.5 to 3.5.

15. The process as claimed in claim 10, wherein the calcium carbonate forming part of the suspension is suspended in two to seven times its quantity of water.

16. The process as claimed in claim 10, wherein the suspension is used in admixture with a polyphosphate to establish a Ca/P-ratio up to 1.

17. The process as claimed in claim 16, wherein the suspension is used in admixture with 0.6 up to 10.0 weight % polyphosphate, based on its calcium carbonate content.

18. The process as claimed in claim 16, wherein Graham's salt is used as the polyphosphate.

* * * * *